United States Patent
Park et al.

(10) Patent No.: US 6,544,437 B2
(45) Date of Patent: Apr. 8, 2003

(54) YTTRIUM SILICATE BASED PHOSPHOR HAVING EFFECTIVE EMISSION AT LOW VOLTAGES AND METHOD FOR SYNTHESIZING THE SAME

(75) Inventors: Shang-hyeun Park, Chungcheongnam-do (KR); Ji-hye Gwak, Seoul (KR); Yong-wan Jin, Seoul (KR); V. A. Vorobyov, Stavropol (RU); E. G. Morozov, Stavropol (RU)

(73) Assignees: Samsung SDI Co., Ltd. (KR); ZAO Scientific Productio Firm (SPF) Luminophor, Stavropol (RU)

( * ) Notice: Subject to any disclaimer, the term of this patent is extended or adjusted under 35 U.S.C. 154(b) by 0 days.

(21) Appl. No.: 09/742,340

(22) Filed: Dec. 22, 2000

(65) Prior Publication Data

US 2001/0013591 A1 Aug. 16, 2001

(30) Foreign Application Priority Data

Dec. 23, 1999 (KR) .......................................... 99-61330

(51) Int. Cl.[7] .......................... C09K 11/79; C09K 11/81
(52) U.S. Cl. ........................ 252/301.4 F; 252/301.4 P
(58) Field of Search .................. 252/301.4 F, 301.4 P

(56) References Cited

U.S. PATENT DOCUMENTS 3,715,611 A * 2/1973 De Mesquita et al. ... 252/301.4 F

FOREIGN PATENT DOCUMENTS

| EP | 0 060 647 | 9/1982 |
| EP | 60647 | * 9/1982 |
| GB | 1 452 180 | 2/1974 |
| GB | 2177714 | 7/1986 |

* cited by examiner

Primary Examiner—C. Melissa Koslow
(74) Attorney, Agent, or Firm—Burns, Doane, Swecker & Mathis, LLP

(57) ABSTRACT

A yttrium silicate based phosphor with excellent luminescent efficiency at low voltages for utility in field emission devices (FEDs), and a method for synthesizing the phosphor. The yttrium silicate based phosphor contains Eu, Ce or Tb as an activator, phosphorus as a flux, and Zn as a sensitizer, based on a yttrium silicate phosphor, for example, $Y_3SiO_5$:Tb phosphor, and thus the luminance is improved.

8 Claims, 6 Drawing Sheets

YTTRIUM SILICATE BASED PHOSPHOR HAVING EFFECTIVE EMISSION AT LOW VOLTAGES AND METHOD FOR SYNTHESIZING THE SAME

This application claims priority under 35 U.S.C. §§119 and/or 365 to 99-61330 filed in Korea on Dec. 23, 1999; the entire content of which is hereby incorporated by reference.

BACKGROUND OF THE INVENTION

1. Field of the Invention

The present invention relates to a phosphor with superior emission efficiency at low voltages, and more particularly, to a yttrium silicate based phosphor having effective emission at low voltages, which is for utility in field emission devices (FEDs), and a method for synthesizing the same.

2. Description of the Related Art

During application of a low voltage to a device, due to the short infiltration length of electrons into a phosphor screen and rapid non-luminescent recombination speed at the surface of the phosphor screen, the luminescent efficiency of phosphor is considerably lowered. To operate a FED with a driving voltage as low as 1 kV or less, there is a need for a phosphor that exhibits a high luminescent efficiency at a low voltage.

A sulfide-based phosphor, which was used for cathode ray tubes (CRTs), has been modified for use in FEDs. Such sulfide phosphors show effective emission at a high voltage of 5 to 10 kV. However, in application to FEDs operated with a driving voltage, there occur the problems of reduced chemical stability and charge build-up. To improve these problems, extensive research has been carried out on oxide based phosphors, particularly on yttrium silicate based phosphors, which are considered to be an excellent phosphor.

Although yttrium silicate based phosphors have better chemical and thermal stabilities than sulfide based phosphors, chromaticity and luminance are very low. Reportedly, a sulfide based green phosphor (ZnS:Cu,Al) has chromaticity (x=0.333, y=0.614), an oxide based phosphor ($Y_2SiO_5$:Tb) has chromaticity (x=0.333, y=0.582). Also, the luminance of the oxide based phosphor is about 30–40% of the luminance of the sulfide based phosphor.

A major challenge in applying oxide based phosphors to FEDs operating with a low voltage is the modification of $Y_2SiO_5$:Tb phosphor for production of superior phosphors with improved luminance and chromaticity. As a result of the efforts, some patents related to the fabrication of such phosphors have been issued. For example, EP0060647 (Sep. 22, 1982) disclosed addition of zinc (Zn) in the amount of 0.46 to 1 moles to a yttrium silicate phosphor. GB2177714 (Jan. 28, 1987) introduced variation of flux. GB1452180 (Oct. 13, 1976) disclosed addition of fluoride ($NH_4F$, $YF_3$ and $BaF_2$) based flux.

SUMMARY OF THE INVENTION

To solve the above problems, it is an objective of the present invention to provide a yttrium silicate based phosphor with superior luminance and chromaticity at low voltages, which is synthesized by modifying $Y_2SiO_5$:Tb extensively being used as a phosphor for field emission displays (FEDs).

It is another objective of the present invention to provide a method for synthesizing a yttrium silicate based phosphor with superior luminance and chromaticity at low voltages.

In one aspect, the present invention provides a yttrium silicate based phosphor having effective emission at low voltages, having the general formula $$(Y_{1-k}Ln_k)_2(Si_{1-y}P_y)O_5 \cdot xZnO$$

where Ln is a lanthanide element selected from gadolinium (Gd), Tb, Ce and Eu, and k, y and x are rational numbers in the range of $0 \leq k \leq 1$, $0 \leq y \leq 1$, and $0 \leq x \leq 1$.

Preferably, in the above formula, k is in the range of 0.0005 to 0.2, x is in the range of 0 to 0.1, and y is in the range of 0.0001 to 0.01.

In another aspect, the present invention provides a method for synthesizing a yttrium silicate based phosphor having effective emission at low voltages by a coprecipitation method, comprising the steps of: (a) dissolving $Y_2O_3$, and Eu, Tb or Ce as an activator, and ZnO as a sensitizer in a nitric acid solution, adding $SiO_2$ powder to the solution, stirring the mixture, and adding the mixture to an oxalic acid aqueous solution to precipitate; (b) filtering the precipitate from step (a) and drying the filtered precipitate; (c) adding a flux to the dried precipitate, firing the mixture at a temperature of 900 to 1000° C. to produce a phosphor; (d) firing the phosphor from step (c) at 1400° C. in an oxidation atmosphere; (e) firing the phosphor from step (d) at a temperature of 1200 to 1300° C. in a reduction atmosphere.

Preferably, the $SiO_2$ powder added in step (a) has a particle size of 0.007 to 0.07 μm.

In another embodiment, a method for synthesizing a yttrium silicate based phosphor having effective voltages at low voltages by a solid state reaction method, comprises the steps of: (a) mixing $Y_2O_3$ and $SiO_2$ powder as host substances, eurobium (Eu), terbium (Tb) and cerium (Ce) powder as an activator, and ZnO powder as a sensitizer; (b) adding a flux to the mixture from step (a) and firing the mixture at a temperature of 900 to 1000° C. to produce a phosphor; (c) firing the phosphor from step (b) at 1400° C. in an oxidation atmosphere; and (d) firing the phosphor from step (c) at a temperature of 1200 to 1 300° C. in a reduction atmosphere.

Preferably, the $SiO_2$ powder added in step (a) has a particle size of 0.007 to 0.07 μm.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

A yttrium silicate based phosphor according to the present invention, which shows superior luminance at low voltages and thus is applicable to field emission displays (FEDs), is obtained by adding eurobium (Eu), cerium (Ce) and terbium (Tb), as an activator, a phosphorous as a flux, and zinc (Zn) as a sensitizer, to a yttrium silicate based phosphor.

The amount of Zn added to the phosphor is in the range of 0 to 0.2 moles. As a flux, fluoride based flux, for example, $NH_4F$ or $BaF_2$, is used. In addition, phosphorus may be further added as a flux along with the fluoride based flux.

Figure 1:
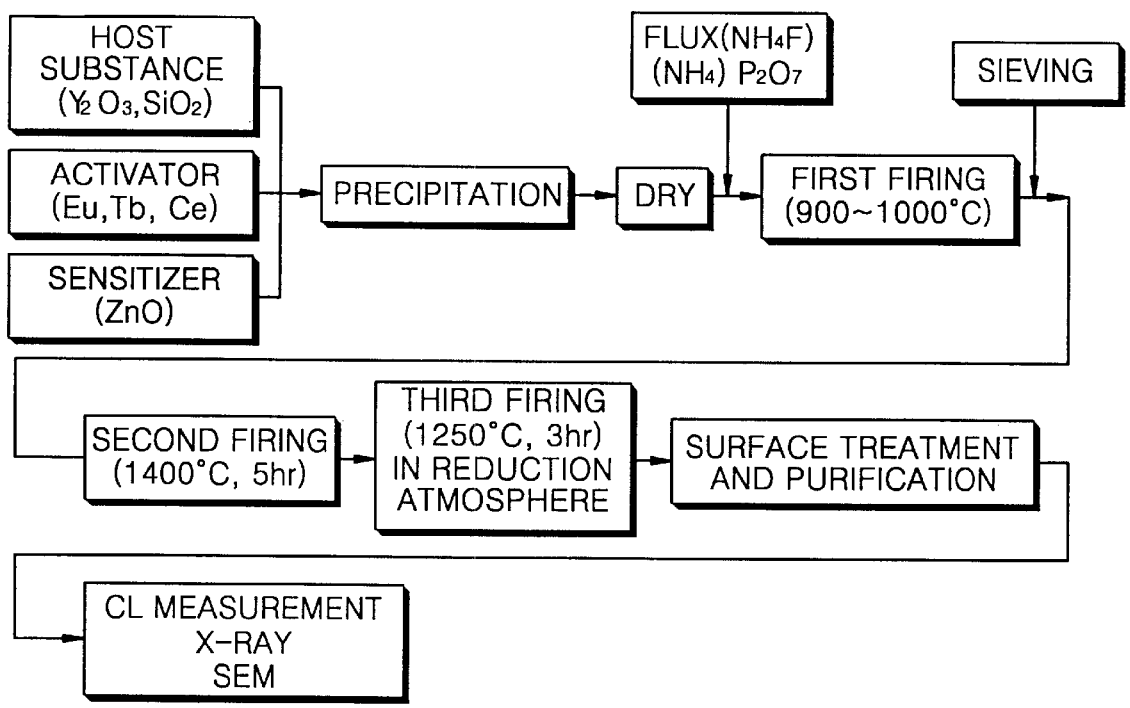
FIG. 1 is a flow chart of successive stages of a method of synthesizing a yttrium silicate based phosphor having effective emission at low voltages according to the present invention.

An oxide based $Y_2SiO_5$:Tb green phosphor, which is a yttrium silicate based phosphor with improved luminance and chromaticity coordinates, according to the present invention is synthesized, as illustrated in FIG. 1, by a coprecipitation method or a solid state reaction method. $Y_2O_3$, $SiO_2$, $Tb_4O_7$ and ZnO are weighed and mixed in an appropriated ratio by mole, and the temperaure of firing was varied in the range of 900 to 1400° C.

According to the coprecipitation method, referring to FIG. 1, $Y_2O_3$ as a host substance, Eu, Tb or Ce as an activator, and ZnO as a sensitizer were dissolved in a nitric acid solution, and another host substance, $SiO_2$ powder, was added to the solution and stirred. Then, an aqueous oxalic acid solution is added to the mixture to precipitate. Preferably, $SiO_2$ powder has a particle size of 0.007 to 0.07 $\mu$m.

Next, the precipitate is filtered and dried. After adding a flux to the dried precipitate, the dried product was fired at a temperature of 900 to 1000° C. to produce a phosphor (first firing step). The phosphor from the first firing step is sieved, and the resultant fine phosphor powder is fired again at 1400° C. in an oxidation atmosphere (second firing step). Then, the phosphor from the second firing step is fired at a temperature of 1200 to 1300° C. in a reduction atmosphere, which results in a desired yttrium silicate phosphor having effective emission at low voltages.

On the other hand, according to the solid state reaction method, $Y_2O_3$ and $SiO_2$ powder as host substances, Eu, Tb and Ce powder as an activator, and ZnO powder as a sensitizer, are mixed, and a flux is added to the mixture. Then, the resultant mixture is subjected to the first firing step at a temperature of 900 to 1000° C. to produce a phosphor. After the first firing step, the second and third firing steps are carried out in the same way as in the coprecipitation method. For this as solid state reaction method, it is preferable to use $SiO_2$ powder having a particle size of 0.007 to 0.07 $\mu$m.

After surface treatment and purification, the cathodeluminescence (CL) intensity of the resultant phosphor was measured using a thermionic electron gun in a UHV chamber at $10^{-7}$ Torr with application of a power of 300 to 1000 eV (with a current of 0.2 to 0.5 mA). Then, the morphology and crystalline characteristics of the phorsphor were observed by scanning electron microscopy (SEM) and X-ray diffraction (XRD).

The function of flux in synthesizing phosphors is important. Flux has a melting point lower than the temperature of the solid state reaction and is thus able to dissolve and carry easily many reactants for the reaction. Flux is not involved in the solid state chemical reaction and is easily washed off. In a preferred embodiment, as a flux, phosphorus is further added to a fluoride based flux, which is commonly used, to enhance luminance. In another embodiment, Zn is added as a sensitizer while varying the amount. As a result, the luminance of phosphors is considerably improved. It is considered that the enhanced luminance is due to the substitution of yttrium by Zn.

Embodiment 1: Addition of $(NH_4)_2P_2O_7$ to $Y_2SiO_5$:Tb phosphor

TABLE 1

| | Flux | | Firing | | |
|---|---|---|---|---|---|
| Raw Material | $NH_4F$ | $(NH_4)_2P_2O_7$ | First | Second | Third |
| G-1 | | 0.6 | No addition | | | |
| G-2 $(Y_{0.88}Tb_{0.12})_2SiO_5$ | 0.6 | 0.05 | 900° C. (2 hr) | 1450° C. (5 hr) | 1300° C. (3 hr) using carbon crucible, carbon cloth, activated carbon (granular type) |
| G-3 $Y_2O_3$ 140 g | 0.6 | 0.1 | | | |
| G-4 $SiO_2$ 42.3 g | 0.6 | 0.01 | | | |
| G-5 Tb 26.7 g | 0.6 | 0.5 | | | |

Figure 2:
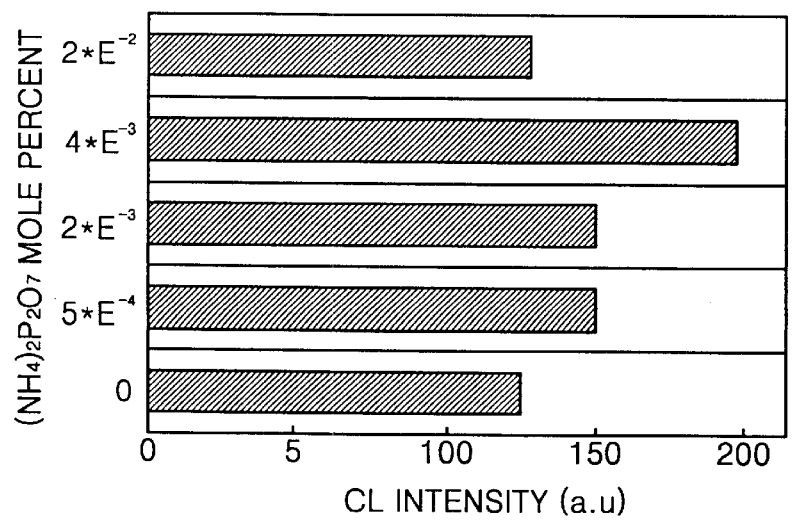
FIG. 2 is a graph illustrating the variation of cathodeluminescence (CL) intensity at 1 kV with respect to the variation in the amount of flux in $Y_2SiO_5$:Tb phosphor.

After adding the existing flux, $NH_4F$, of 0.6% by mole, to the raw materials listed in Table 1, and a new flux, phosphorous, was further added in various ratios as shown in Table 1. the CL intensity of the resultant phosphors was measured. The results are shown in FIG. 2. FIG. 2 shows the variation of CL intensity at 1 kV with respect to a variation in the amount of flux used in the synthesis of $Y_2SiO_5$:Tb phosphor. As shown in FIG. 2, the addition of phosphorus increases the CL up to 60%.

Figure 3:
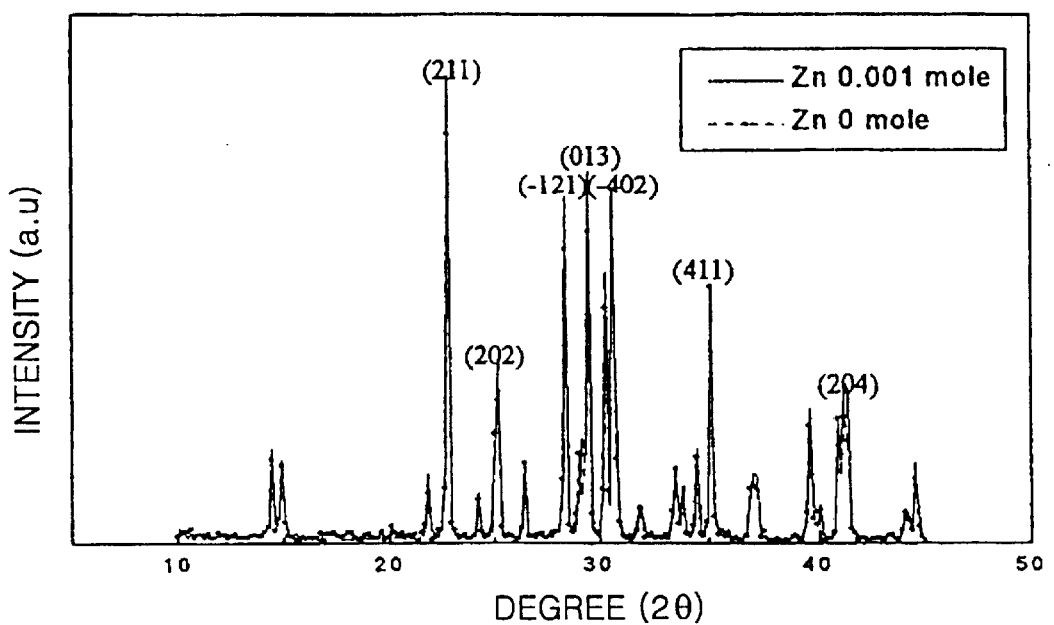
FIG. 3 illustrates the X-ray diffraction (XRD) pattern of $(Y_{1-x}Zn_x)_2SiO_5$:Tb phosphor, showing the effect of Zn.

Embodiment 2: Variation in the amount of Zn in $(Y_{1-x}Zn_x)_2SiO_5$:Tb phosphor FIG. 3 illustrates the X-ray diffraction (XRD) pattern of $(Y_{1-x}Zn_x)_2SiO_5$:Tb phosphor, which shows the effect of Zn. As shown in FIG. 3, the addition of Zn of 0.001 mole shows better crystalline properties than no addition of Zn, and unreacted Zn or other peaks are not detected.

Figure 4A:
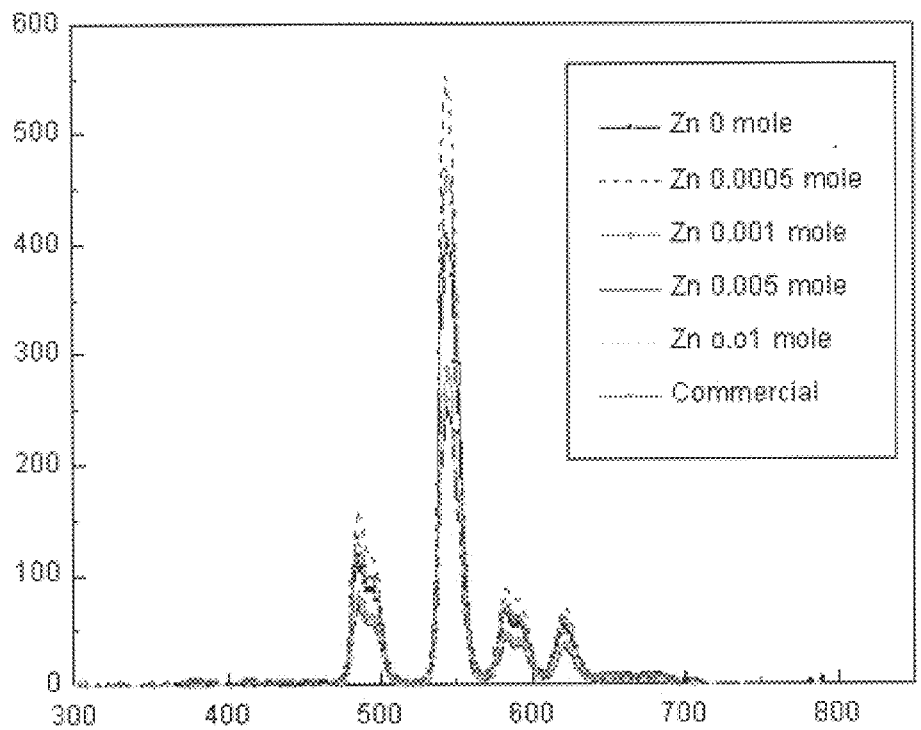
FIGS. 4A and 4B are a graph of CL spectra and a chromaticity diagram of $(Y_{1-x}Zn_x)_2SiO_5$:Tb phosphor measured at 500 eV, respectively, showing the effect of the addition of Zn.
Figure 4B:
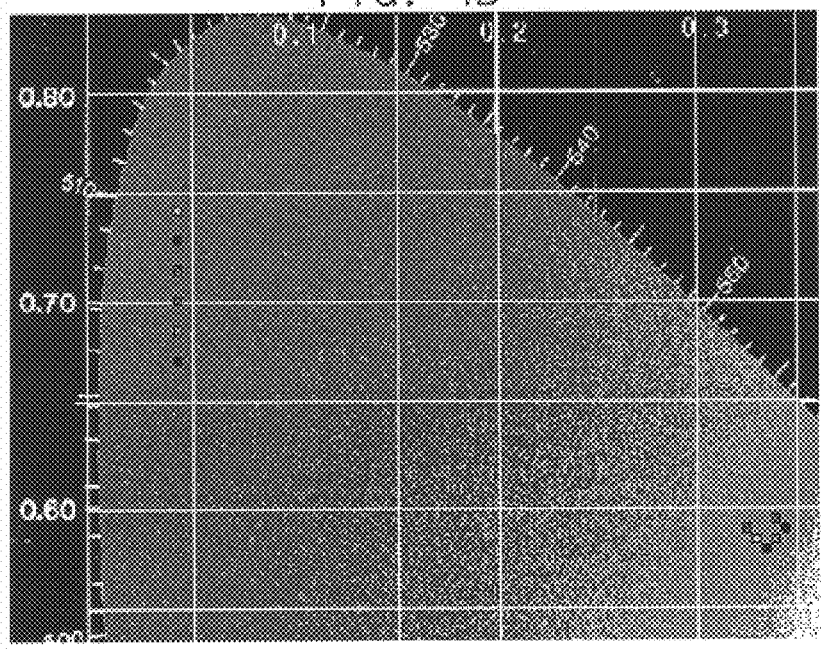

FIGS. 4A and 4B are a graph of CL spectra and a chromaticity diagram of $(Y_{1-x}Zn_x)_2SiO_5$:Tb phosphor measured at 500 eV, respectively, showing the effect of the addition of Zn. The CL spectra of FIG. 4A indicate that although the amount of Zn, which serves as a sensitizer, is varied, only the CL intensity changes with the same main peaks. When Zn of 0.005 mole is added, the CL intensity of the phosphor is 40% higher than the phosphor without Zn, and 20% higher than a commercial available phosphor. As shown in FIG. 4B, the chromaticity coordinates of the phosphor containing 0.005-mole Zn is excellent at (x=0.3368, y=0.5715) compared to the commercial phosphor containing no Zn, which has the chromaticity coordinates (x=0.3431, y=0.553).

Figure 5:
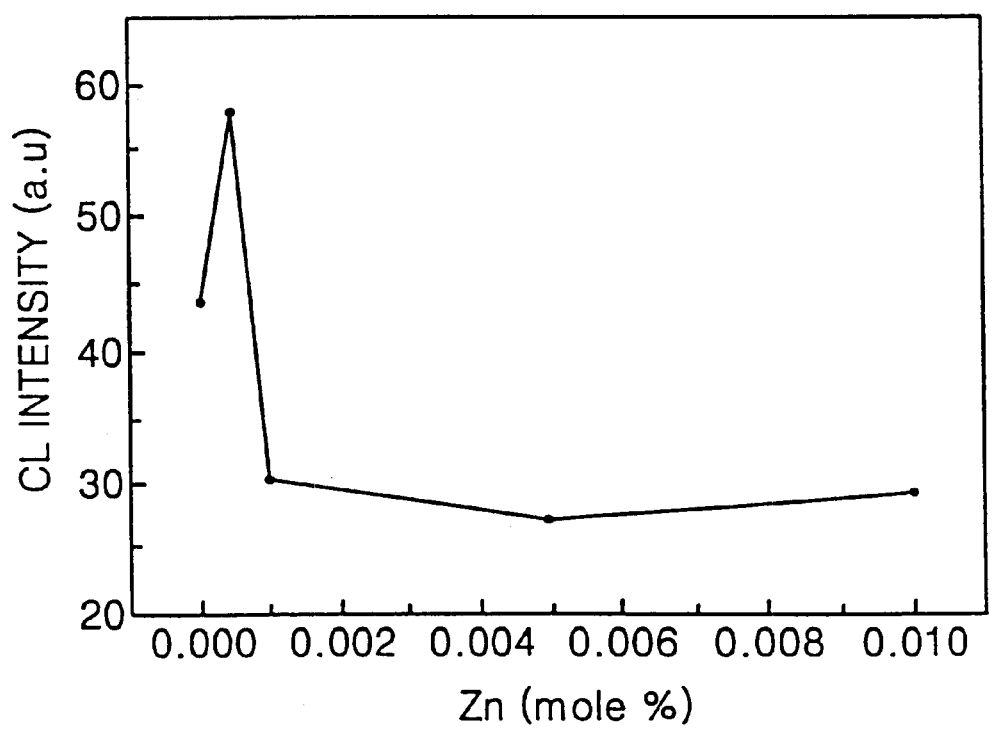
FIG. 5 is a graph showing the variation of CL intensity with respect to the variation in the amount of Zn in $(Y_{1-x}Zn_x)_2SiO_5$:Tb phosphor.

FIG. 5 is a graph showing the variation of CL intensity with respect to a variation in the amount of Zn in $(Y_{1-x}Zn_x)_2SiO_5$:Tb phosphor.

Figure 6:
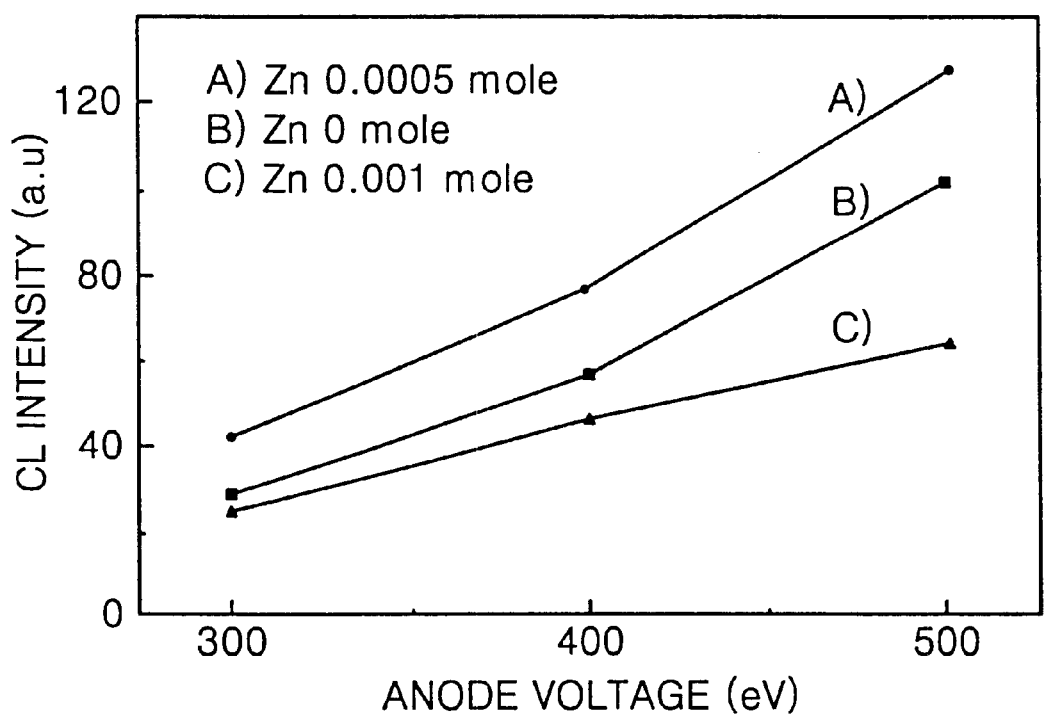
FIG. 6 is a graph showing the variation of CL intensity at various Zn concentrations in $(Y_{1-x}Zn_x)_2SiO_5$:Tb phosphor with respect to the variation of voltage level.

The CL intensity of $(Y_{1-x}Zn_x)_2SiO_5$:Tb phosphor at various Zn concentrations in with respect to a variation of anode voltage was measured. The result is shown in FIG. 2. As shown in FIG. 6, at low voltages of 300 to 500 eV, the phosphor containing 0.0005-mole Zn shows excellent CL intensity.

Figure 7:
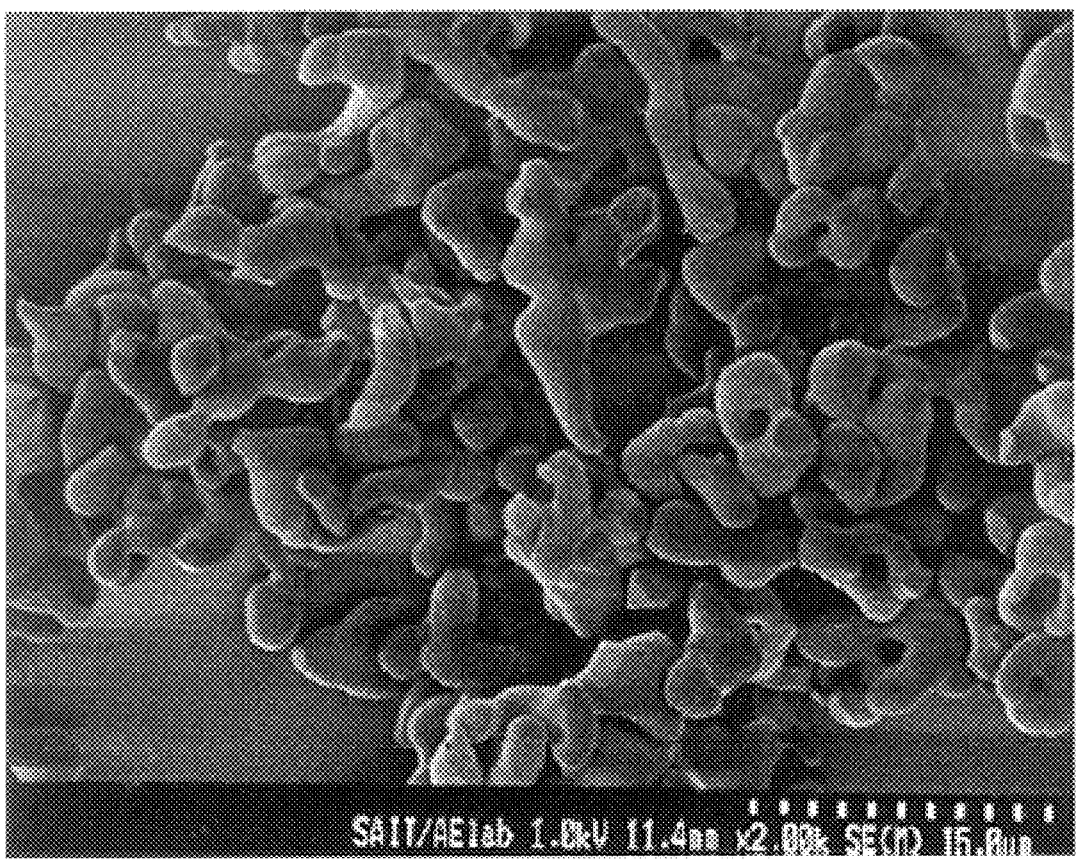
FIG. 7 is a scanning electron microscopy (SEM) photo of $(Y_{0.9895}Zn_{0.0005})_2SiO_5$: Tb phosphor.

FIG. 7 is a scanning electron microscopy (SEM) photo of $(Y_{0.9895}Zn_{0.0005})_2SiO_5$:Tb phosphor.

As previously mentioned, the yttrium silicate based phosphor having effective emission at low voltages according to the present invention contains Eu, Ce or Tb as an activator, phosphorus as a flux, and Zn as a sensitizer, based on a yttrium silicate phosphor, for example, $Y_3SiO_5$:Tb phosphor, and thus the luminance is improved. Compared to the phosphor containing no Zn, the phosphor containing 0.005-mole Zn shows a 40% increase in luminance without changing the chromaticity coordinate. Also, the luminance of the phosphor containing 0.005-mole Zn is enhanced by 20% compared to a commercial phosphor, the chromaticity coordinates (x=0.3368, y=0.5715) are also better than the commercial phosphor (x=0.3431, y=0.553). In addition, the addition of phosphor as a flux increases the luminance up to 60%.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A yttrium silicate based phosphor having effective emission at low voltages, having the general formula $$(Y_{1-k}Ln_k)_2(Si_{1-y}P_y)O_5 \cdot xZnO$$

where Ln is a lanthanide element selected from the group consisting of Gd, Tb, Ce and Eu, and k, y and x are rational numbers in the range of $0 \leq k \leq 1$, y is in the range of 0.0001 to 0.01, and $0 \leq x \leq 1$.

2. The yttrium silicate based phosphor of claim 1, wherein k is in the range of 0.0005 to 0.2.

3. The yttrium silicate based phosphor of claim 1, wherein x is in the range of 0 to 0.1.

4. A method for synthesizing a yttrium silicate based phosphor having effective emission at low voltages by a coprecipitation method, comprising the steps of:

(a) dissolving $Y_2O_3$, and Eu, Tb or Ce as an activator, and ZnO as a sensitizer in a nitric acid solution, adding $SiO_2$ powder to the solution, stirring the mixture, and adding the mixture to an oxalic acid aqueous solution to precipitate;

(b) filtering the precipitate from step (a) and drying the filtered precipitate;

(c) adding a flux to the dried precipitate, firing the mixture at a temperature of 900 to 1000° C. to produce a phosphor;

(d) firing the phosphor from step (c) at 1400° C. in an oxidation atmosphere;

(e) firing the phosphor from step (d) at a temperature of 1200 to 1300° C. in a reduction atmosphere.

5. The method of claim 4, wherein the $SiO_2$ powder added in step (a) has a particle size of 0.007 to 0.07 $\mu$m.

6. A method for synthesizing a yttrium silicate based phosphor having effective voltages at low voltages by a solid state reaction method, comprising the steps of:

(a) mixing $Y_2O_3$ and $SiO_2$ powder as host substances, eurobium (Eu), terbium (Tb) and cerium (Ce) powder as an activator, and ZnO powder as a sensitizer;

(b) adding a flux to the mixture from step (a) and firing the mixture at a temperature of 900 to 1000° C. to produce a phosphor;

(c) firing the phosphor from step (b) at 1400° C. in an oxidation atmosphere; and (d) firing the phosphor from step (c) at a temperature of 1200 to 1300° C. in a reduction atmosphere.

7. The method of claim 6, wherein the $SiO_2$ powder added in step (a) has a particle size of 0.007 to 0.07 $\mu$m.

8. A yttrium silicate based phosphor having effective emission at low voltages, having the general formula $$(Y_{1-k}Ln_k)_2(Si_{1-y}P_y)O_5 \cdot xZnO$$

where Ln is a lanthanide element selected from the group consisting of Gd, Tb and Eu, and k, are rational numbers in the range of $0 \leq k \leq 1$, $0 \leq y \leq 1$, and $0 \leq x \leq 1$.

* * * * *

UNITED STATES PATENT AND TRADEMARK OFFICE
CERTIFICATE OF CORRECTION

PATENT NO.      : 6,544,437 B2
DATED           : April 8, 2003
INVENTOR(S)     : Shang-hyeun Park et al.

It is certified that error appears in the above-identified patent and that said Letters Patent is hereby corrected as shown below:

<u>Title page,</u>
Item [73], Assignee, in the name of the second Assignee, please change
"Productio" to -- Production --.

Signed and Sealed this

Ninth Day of September, 2003

JAMES E. ROGAN
*Director of the United States Patent and Trademark Office*